United States Patent [19]

Homan et al.

[11] 4,239,674
[45] Dec. 16, 1980

[54] OXYGEN-CURABLE MERCAPTOORGANOSILOXANE COMPOSITIONS CATALYZED BY COBALTOCENE COMPOUNDS AND METHOD OF FORMING HIGHER MOLECULAR WEIGHT PRODUCTS THEREFROM

[75] Inventors: Gary R. Homan; Chi-long Lee, both of Midland, Mich.

[73] Assignee: Dow Corning Corporation, Midland, Mich.

[21] Appl. No.: 63,017

[22] Filed: Aug. 2, 1979

[51] Int. Cl.$^3$ .............................................. C08L 83/08
[52] U.S. Cl. ................................. 260/37 SB; 528/15; 528/30
[58] Field of Search ................. 528/15, 30; 260/37 SB

[56] References Cited

U.S. PATENT DOCUMENTS

| | | | |
|---|---|---|---|
| 2,466,963 | 4/1949 | Patrick et al. | 528/388 |
| 3,445,419 | 5/1969 | Vanderlinde | 260/37 SB |
| 4,066,603 | 1/1978 | Homan et al. | 528/30 |
| 4,070,328 | 1/1978 | Homan et al. | 260/37 SB |
| 4,070,329 | 1/1978 | Homan et al. | 260/37 SB |
| 4,133,939 | 1/1979 | Bokerman et al. | 428/447 |

OTHER PUBLICATIONS

Cranker et al., "Use of Polysulfide Liquid Polymers for Impregnation of Leather," American Leather Chem. Assn. Journal, 47 pp. 171-191 (1952).
High Polymers, Ch XIII, Polyether Part III, Gaylord, ed., Interscience Publishers, pp. 175, 191-192, 215, 219, 223 (1962).
Condensed Chemical Dictionary, 8th Edition, Van Nostrand Reinhold Co. p. 223 (1971).

*Primary Examiner*—Melvyn I. Marquis
*Attorney, Agent, or Firm*—Richard E. Rakoczy

[57] ABSTRACT

Compositions stable in the absence of oxygen are formed by mixing the following substantially in the absence of oxygen
(A) mercapto-functional organosiloxanes containing at least two mercapto groups per molecule,
(B) optionally, a filler, and
(C) a catalytic amount of a cobaltocene of the formula $(R^3C_5H_4)Co(C_5H_4R^4)$, wherein each $R^3$ and $R^4$ is hydrogen or methyl, preferably, 0.01-6 parts by weight of $(C_5H_5)_2Co$ per 100 parts by weight of (A) above.

The compositions polymerize or cure upon exposure to oxygen. By utilizing various types and amounts of mercapto-functional organosiloxanes, higher molecular weight products useful as encapsulating gels, coating resins, or elastomeric sealants can be obtained by the method of exposing the compositions of the present invention to oxygen.

24 Claims, No Drawings

OXYGEN-CURABLE MERCAPTOORGANOSILOXANE COMPOSITIONS CATALYZED BY COBALTOCENE COMPOUNDS AND METHOD OF FORMING HIGHER MOLECULAR WEIGHT PRODUCTS THEREFROM

BACKGROUND OF THE INVENTION

1. Field of the Invention

This invention relates to compositions including organosiloxane polymers containing sulfur and to a method of forming higher molecular weight products from such compositions. This invention also relates to organosiloxane gels, elastomers and resins containing sulfur.

2. Description of the Prior Art

Compositions containing mercaptoorganosiloxanes free of any vinyl functionality which are polymerized by means of the mercapto groups to resins and sealants are known in the art. For example, in U.S. Pat. No. 4,133,939, Bokerman and Gordon teach a method of coating a substrate with a silicone release coating involving the radiation cure of mercapto-functional polydiorganosiloxane fluids mixed with a sensitizer such as benzophenone. While a radiation curing mechanism is rapid and provides one-package systems stable in the absence of light and heat, it is useful only for relatively thin coatings and requires a high intensity radiation source such as ultraviolet light or electron beams.

Peroxide cure of mercaptoorganosiloxanes free of vinyl unsaturation is also known, as demonstrated by Homan and Lee in U.S. Pat. No. 4,070,329. In that patent, the patentees teach mixtures of mercaptoorganopolysiloxanes, organic peroxide and, optionally, a filler to provide a composition which cures at room temperature or by heating to form elastomers which are useful as sealants and rubber articles. Likewise, Homan and Lee in U.S. Pat. No. 4,070,328 claim mixtures of mercaptoorganopolysiloxanes, organic hydroperoxides, a nitrogen compound and, optionally, a filler which produce compositions which cure at room temperature to elastomers which are useful as sealants and rubber articles. However, the above compositions are not one-package systems since the polymerization or cure begins immediately upon mixing the ingredients.

Vanderlinde, in U.S. Pat. No. 3,445,419, teaches the production of a type of mercapto-functional copolymer consisting of organosiloxanes with mercapto-functional organic compound segments which are prepared by grafting a mercapto-functional carboxylic acid ester such as pentaerythritol tetrakis (3-mercapto-propionate) onto a vinyl-terminated organosiloxane. When an alkaline catalyst such as an amine is added to the resulting graft-copolymer, there is obtained a composition which is stable in the absence of air, but cures to an elastomer at room temperature upon exposure to air. However, to prepare the Vanderlinde compositions, the use of both an aliphatically unsaturated organopolysiloxane and a grafting operation which introduces an additional amount of organic compound into the cured product is required. Furthermore, Vanderlinde does not suggest that a cobaltocene can be used either to prepare or to polymerize or cure the compositions hereinafter described.

DESCRIPTION OF THE INVENTION

The novel distinguishing features of the present invention are that the use of a cobaltocene compound catalyst produces compositions which are one-package, storage-stable in the absence of oxygen, and easily cured by simply exposing the composition to an oxygen atmosphere, such as air, or pure oxygen gas. The compositions of the present invention have an advantage over acetoxy-functional, moisture-cured, one-component compositions, such as those found in U.S. Pat. Nos. 3,035,016 and 3,077,465, in that no corrosive by-products are evolved during cure. The compositions of the present invention are substantially free of any volatile by-products during polymerization or cure. Compositions which do not evolve volatile by-products such as those which utilize platinum-catalyzed addition of SiH to vinyl are preferably cured by heating when formulated into one-package systems. These one-package, platinum-catalyzed systems cure very slowly at room temperature. Fast, room temperature cures require the use of a two-package system while compositions of the present invention are one-package systems which cure much faster at room temperature than one-package platinum catalyzed systems.

This invention relates to a composition, stable in the absence of oxygen, which comprises a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

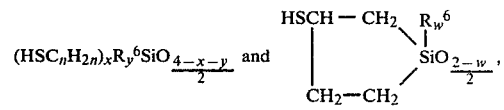

any other siloxane units present having the average unit formula

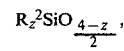

wherein
each $R^2$ is a hydroxyl radical or an organic radical selected from the group consisting of $R^6$ and 3,3,3-trifluoropropyl radicals,
each $R^6$ is $R^5$ or $OR^1$,
each $R^5$ is an alkyl radial of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive and the sum of x+y has a value of from 1 to 3 inclusive,
and the ratio of the total $R^5$, $HSC_nH_{2n}$—,

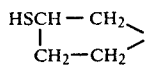

and 3,3,3-trifluoropropyl radicals to silicon atoms in the mercapto-functional organosiloxane is in the range of 0.98/1 to 3.00/1;

(B) 0-200 parts by weight of at least one filler; and (C) a catalytic amount of a cobaltocene of a formula $(R^3C_5H_4)Co(C_5H_4R^4)$ wherein each $R^3$ and $R^4$ is a hydrogen atom or methyl.

The invention also relates to a method of forming a higher molecular weight product which comprises the steps of (I) mixing 100 parts by weight of at least one mercapto-functional organosiloxane defined in (A) above and a catalytic amount of a cobaltocene defined in (C) above to form a mixture and (II) exposing such mixture to oxygen. This invention further relates to the product obtained by exposing the above composition or mixture to oxygen.

For the purposes of this application, the term "oxygen" is intended to mean gaseous oxygen which can be in the form of pure oxygen gas or atmospheric oxygen. Mercapto-functional organosiloxanes will also be referred to as mercaptoorganosiloxanes and includes disiloxanes, trisiloxanes, and polysiloxanes consisting of siloxane units, some of which are mercapto-functional. Techniques for mixing compositions which are oxygen or moisture sensitive are well-known in the art. Bread dough mixers can be used for viscous mercaptoorganosiloxanes and low-shear mixers can be used for lower viscosity compositions.

This invention has two aspects. One is a novel method of polymerizing or curing mercapto-functional organosiloxanes to form higher molecular weight products. The other is directed toward the formation of storage-stable compositions. In order to accomplish the first aspect, one merely exposes a mixture of the mercapto-functional organosiloxane and a cobaltocene to oxygen. Thus, if storage stability is not required, the mercapto-functional organosiloxane and cobaltocene can be mixed together in the presence of oxygen and immediately allowed to polymerize or cure.

When storage-stable compositions are desired, the ingredients are mixed in the substantial absence of oxygen by any well-known means. The preferred procedure is to mix the mercaptoorganosiloxanes and filler, if any, under a dry nitrogen atmosphere. The mixture may then be subjected to a vacuum, such as 30 mm of mercury, for a short time to remove any trapped oxygen and water. The cobaltocene catalyst can then be added, preferably as a solution in an organic solvent such as toluene. Since cobaltocenes are somewhat sensitive to water and oxidation by oxygen (such compounds can also absorb carbon dioxide), it is preferable that the compositions be substantially free of both water and oxygen to maximize storage life. Small amounts of water merely reduce the cure rate slightly while the presence of oxygen will cause premature gelation. Therefore, the containers used to store the catalyzed compositions should be carefully selected to avoid materials which are sufficiently oxygen permeable to appreciably affect storage stability.

The substituents attached to silicon atoms can be $R^2$ which can be hydroxyl, $R^6$ or 3,3,3-trifluoropropyl radicals. $R^6$ can be $R^5$ which can be alkyl radicals of 1 to 4 inclusive carbon atoms such as methyl, ethyl, propyl, isopropyl and butyl, phenyl radicals, or alkoxy radicals of the formula $OR^1$, where $R^1$ is an alkyl radical of 1 to 4 inclusive carbon atoms, such as methoxy, ethoxy, isopropoxy and butoxy. The mercapto-functional substituents present in the form of $HSC_nH_{2n}$—where n is 2 to 4 can be, for example, beta-mercaptoethyl, gamma-mercaptopropyl, 3-mercaptobutyl, and 3-mercapto,2-methylpropyl. Another mercapto-functional substituent can be 2-mercaptotetramethylene where both ends of the 2-mercaptotetramethylene molecule are attached to the same silicon atom.

The siloxane units containing no mercapto groups which have the average unit formula

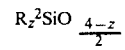

can be $SiO_2$ units, monosubstituted units such as monomethylsiloxane units, monoethylsiloxane units, monopropylsiloxane units, monobutylsiloxane units or monophenylsiloxane units; disubstituted units such as dimethylsiloxane units, diethylsiloxane units, diphenylsiloxane units, phenylmethylsiloxane units, methylbutylsiloxane units, phenylethylsiloxane units, 3,3,3-trifluoropropylmethylsiloxane units, and methylisopropylsiloxane units; and trisubstituted units such as trimethylsiloxane units, phenyldimethylsiloxane units, triethylsiloxane units, diphenylmethylsiloxane units, diphenylisopropylsiloxane units, 3,3,3-trifluoropropyldimethylsiloxane units, diphenylbutylsiloxane units, and triphenylsiloxane units.

The mercapto-functional siloxane units which have the average unit formula

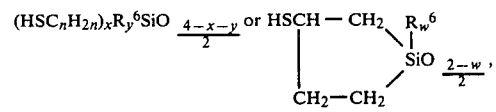

include the following:

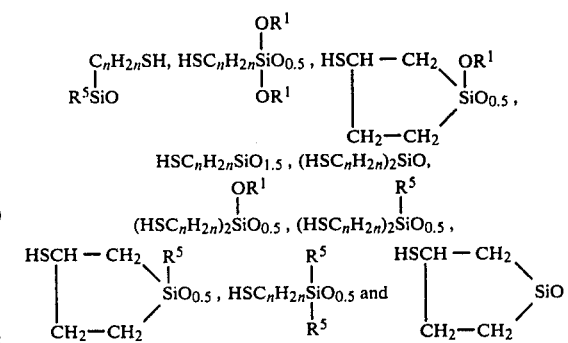

wherein the values of $R^1$, $R^5$, and n are defined above, and preferably n is 3. Mercaptoorganosiloxanes useful in the present invention contain an average of at least two mercapto-functional siloxane units per molecule.

The cured products of this invention can range in properties from soft gels to tough elastomers to hard resins. Physical properties such as durometer value and hardness are related to cross-link density. Cross-link density can be varied by several mechanisms. One mechanism is by adjusting the ratio of organic substituents (total alkyl, mercapto-functional, 3,3,3-trifluoropropyl and phenyl substituents) bonded through Si-C bonds to silicon. Generally, the lower the ratio, the harder the cured product will be when all other variables, such as types of substituents and structure, are kept equal. Another means for varying the cross-link density is to increase the number of mercapto-functional siloxane units per molecule in the mercaptoorganosiloxane.

Compositions consisting only of mercaptoorganosiloxanes which contain an average of only two mercapto groups per molecule are generally only capable of chain-extension upon exposure to oxygen and thus produce higher molecular weight gums which could find utility as encapsulants. Compositions containing an average of more than two mercapto groups per molecule are capable of polymerizing in the presence of oxygen to form three-dimensional networks which can range from soft gels where the average number of mercapto groups per molecule is close to two to hard resins where the mole percent of mercapto-functional siloxane units based on the total number of siloxane units in the mercaptoorganosiloxane approaches 100 percent.

The compositions of the present invention are especially useful in forming elastomeric products with tack-free surfaces which are produced by simply exposing the composition to air. Compositions curable to elastomers with a wide variety of physical properties can easily be formulated by selecting the proper mercapto-functional polydiorganosiloxanes.

Pendant-functional mercaptopolydiorganosiloxanes useful in compositions of the present invention are mercaptopolydiorganosiloxanes containing $R_3^5SiO_{0.5}$ or $R_2^5(HO)SiO_{0.5}$ endblocking siloxane units, and mercapto-functional siloxane units selected from the group consisting of

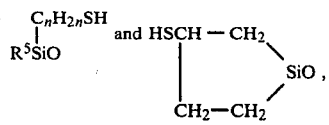

any remaining siloxane units being $R_2^5SiO$, wherein $R^5$ and n are defined above, the average number of mercapto-functional siloxane units per molecule is greater than 2 and the number average molecular weight of the pendant-functional mercaptopolydiorganosiloxane is less than 400,000. Compositions consisting solely of pendant-functional mercaptopolydiorganosiloxanes can result in products which range in properties from soft gels to elastomers to hard resins when exposed to oxygen.

When the pendant-functional mercapto-polydiorganosiloxanes are used as the sole type of mercaptoorganosiloxane in formulations curable to elastomers, it is preferred that $R^5$ is methyl, n is 3, and the pendant-functional mercaptopolydiorganosiloxane has a number average molecular weight of less than 100,000 and contains a sufficient number of mercapto-functional siloxane units to result in a weight percentage of mercapto groups in the range of 0.1 to 2.5 percent based on the total weight of pendant-functional mercaptopolydiorganosiloxane.

Terminal-functional mercaptopolydiorganosiloxanes useful in elastomeric sealant, gel and gum formulations as chain-extending polymers are mercaptopolydiorganosiloxanes containing mercapto-functional siloxane units selected from the group consisting of

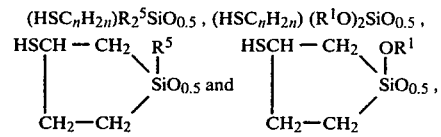

any remaining units being $R_2^5SiO$, wherein $R^5$, $R^1$ and n are defined above and the number average molecular weight of the terminal-functional mercaptopolydiorganosiloxane is less than 400,000. Preferably, the mercapto-functional siloxane units are selected from the group consisting of

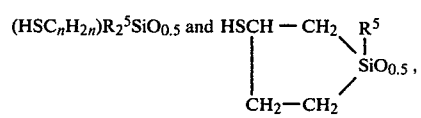

each $R^5$ and $R^1$ is methyl, n is 3, the number average molecular weight of the mercaptopolydiorganosiloxane is less than 100,000 and the weight percentage of mercapto groups present is in the range of 0.07 to 0.5 percent of the total weight of terminal-functional mercaptopolydiorganosiloxane. Polymerization of terminal-functional structures alone generally produces gums because only linear chain-extension is possible.

Another type of mercaptopolydiorganosiloxane useful in compositions of the present invention is a terminal-functional mercaptopolydiorganosiloxane which also contains pendant mercapto-functional siloxane units (hereinafter referred to as hybrid-functional mercaptopolydiorganosiloxanes). Such mercaptopolydiorganosiloxanes contain two terminal mercapto-functional siloxane units selected from the group consisting of

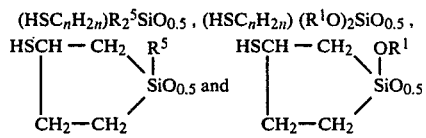

and at least one mercapto-functional siloxane unit selected from the group consisting of siloxane units of the formula

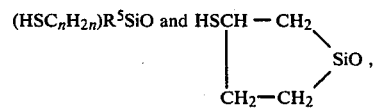

any remaining siloxane units being $R_2^5SiO$, wherein $R^1$, $R^5$ and n are defined above and the number average molecular weight of the mercaptopolydiorganosiloxane is less than 400,000. Compositions consisting solely of hybrid-functional mercaptopolydiorganosiloxanes can result in products which range in properties from soft gels to elastomers to hard resins when exposed to oxygen.

Hybrid-functional mercaptopolydiorganosiloxanes are quite versatile and can be used as the sole type of mercaptopolydiorganosiloxane in formulations which cure to elastomers. In such formulations, it is preferred that the terminal mercapto-functional siloxane units are selected from the group consisting of

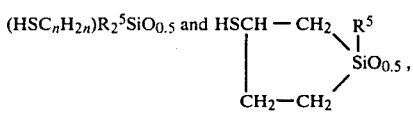

each $R^1$ and $R^5$ is methyl and the hybrid-functional mercaptopolydiorganosiloxane has a number average molecular weight of less than 100,000 and contains a sufficient number of mercapto-functional siloxane units to result in a weight percentage of mercapto groups in the range of 0.1 to 3 percent based on the total weight of hybrid-functional mercaptopolydiorganosiloxane. Hybrid-functional mercaptopolydiorganosiloxanes can be produced which cure to elastomeric products which range in properties from soft products with high elongation values to hard products which are not easily elongated by adjusting the molecular weight and/or the weight percent of mercapto groups in the mercaptopolydiorganosiloxane.

Blends of pendant- and terminal-functional mercaptopolydiorganosiloxanes can be used to obtain products which range in properties from soft gels to hard resins or from gums to hard rubbers. Likewise, the properties of hybrid-functional mercaptopolydiorganosiloxanes can also be altered by blending them with terminal-functional mercaptopolydiorganosiloxanes. To obtain blends which cure to elastomers it is preferred that mercaptopolydiorganosiloxanes which are within the aforementioned preferred ranges for the mercaptopolydiorganosiloxanes be used. Thus, a blend of pendant- and terminal-functional mercaptopolydiorganosiloxanes would contain at least 0.1, but less than 2.5, weight percent of mercapto groups based upon the total weight of the mercaptopolydiorganosiloxanes in the blend while a blend of hybrid- and terminal-functional mercaptopolydiorganosiloxanes would contain at least 0.1, but less than 3, weight percent mercapto groups based upon the total weight of the mercaptopolydiorganosiloxanes in the blend.

The methods for preparing the above mercaptopolydiorganosiloxanes are well-known in the art. One method for making a type of pendant-functional mercaptopolydiorganosiloxane containing $(HSC_nH_{2n})R^5SiO$ and $R_3^5SiO_{0.5}$ siloxane units is taught by Viventi in U.S. Pat. No. 3,346,405. Another method is taught in the Bokerman, et al, patent described previously. Pendant-functional mercaptopolydiorganosiloxanes containing $(HSC_nH_{2n})R^5SiO$ and $(HO)R_2^5SiO_{0.5}$ siloxane units can be produced by modifying the Viventi or Bokerman, et al, methods above. For example, such hydroxyl-endblocked mercaptopolydiorganosiloxanes can be produced by omitting the addition of triorganochlorosilane from the reaction mixture in the method taught by Viventi. Le Grow, in U.S. Pat. No. 3,655,713, teaches a procedure for making both pendant-functional and terminal-functional types of mercaptopolydiorganosiloxanes containing siloxane units possessing 2-mercaptotetramethylene substituents.

Several methods for producing terminal-functional mercaptopolydiorganosiloxanes containing $(HSC_nH_{2n})R_2^5SiO_{0.5}$ siloxane units are known. One method involves the use of a disiloxane bearing a silicon-bonded mercaptoalkyl radial, such as sym-tetramethyl bis(3-mercaptopropyl)disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered. Hybrid-functional polymers can be prepared using the same type of compounds and techniques outlined above for producing terminal-functional mercaptopolydiorganosiloxanes by adding a cyclic mercaptopolydiorganosiloxane such as {HSCH$_2$CH$_2$CH$_2$(CH$_3$)SiO}$_4$ to the reaction mixture to introduce pendant-functional groups into the mercaptopolydiorganosiloxane. Likewise, the compounds and techniques used in preparing pendant-functional mercaptopolydiorganosiloxanes can be used to produce hybrid-functional types by substituting mercapto-functional endblocking units, which can be introduced in the form of a disiloxane such as sym-tetramethyl bis(3-mercaptopropyl)disiloxane, in place of non-functional endblocking units, such as those introduced in the form of hexamethyldisiloxane, in the reaction mixture.

Cyclic mercaptopolydiorganosiloxanes can be prepared by various methods, one of which involves preparing the corresponding chloroalkylsilane, such as 3-chloropropylmethyldichlorosilane, and hydrolyzing the silanes to form a mixture of linear and cyclic polydiorganosiloxanes. If desired, the ratio of cyclic to linear polydiorganosiloxanes can be altered by heating in the presence of an acidic catalyst for a period of time, during which time a portion of the cyclic polydiorganosiloxanes formed is being removed by distillation to shift the equilibrium of the reaction in the direction which favors the formation of cyclic polydiorganosiloxanes. Then, for example, Viventi teaches that the chloroalkyldiorganosiloxanes can be reacted with sodium sulfohydride to produce mercaptopolydiorganosiloxanes. Mercapto-functional silanes containing alkoxy groups such as 3-mercaptopropylmethyldimethoxysilane can also be hydrolyzed at about 40°–50° C. in the presence of an acidic catalyst and vacuum-stripped at 120° C. to remove the alcohol and other undesirable volatiles generated. Such mixtures can also be referred to as, for example, the 3-mercaptopropylmethyl hydrolyzate of 3-mercaptopropyldimethoxysilane. Other means for preparing cyclic mercaptopolydiorganosiloxanes will be apparent to persons skilled in the art.

The production of a type of mercapto-functional organosiloxane resins by the partial hydrolysis of silanes such as $HSC_nH_{2n}Si(OR^1)_3$ and $R_2^5Si(OR^1)_2$ is also demonstrated by the Viventi patent. Likewise, mercapto-functional organosiloxane resins result when a sufficient number of siloxane units such as $R^5SiO_{1.5}$ are present in the mercaptoorganolsiloxanes taught in the Le Grow patent. The Viventi, Le Grow and Bokerman, et al, patents are hereby incorporated by reference to teach the production of mercaptoorganosiloxanes useful in the compositions of the present invention.

Mercaptopolydiorganosiloxanes which contain endblocking units of the formula

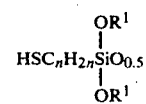

can be prepared by reacting a hydroxyl endblocked polydiorganosiloxane and a (mercaptoalkyl)trialkoxysilane of the formula $HSC_nH_{2n}Si(OR^1)_3$ in the presence of solid potassium hydroxide or potassium silanolate catalysts. The potassium silanolate catalyst is preferred for higher viscosity polydiorganosiloxanes. The (mercaptoalkyl)trialkoxysilane is preferably used in excess of about 10 mole percent of stoichiometric amounts. The resulting product is essentially a polydiorganosiloxane endblocked with units of the formula

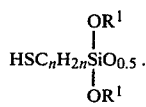

There may be some small amounts of units wherein two SiOH groups have reacted with one (mercaptoalkyl)trialkoxysilane molecule, but these amounts are small enough that the character of the endblocked polydiorganosiloxane is not noticeably altered.

Compositions with various properties may be formulated using the above mercaptopolydiorganosiloxanes. Generally, use of only the pendant-functional mercaptopolydiorganosiloxanes results in elastomers with higher modulus values than formulations which additionally include terminal-functional mercaptopolydiorganosiloxanes. The latter give elastomers with lower modulus values which are thus capable of much greater elongation before the cured composition tears. As a result, the sole use of pendant-functional mercaptopolydiorganosiloxanes results in cured sealants which are less readily elongated and are therefore primarily useful where there is only a small amount of movement in the joint to be sealed. Combinations of the pendant- or hybrid-functional and terminal-functional mercaptopolydiorganosiloxanes are preferred where elastomeric building sealant formulations are desired for use in applications where a relatively large degree of joint movement occurs due to varying temperatures although such combinations can also be used in many other sealant applications. Formulations which cure to elastomers having elongation values of greater than 1000 percent at break and a modulus value at 100 percent elongation in the range of 210 to 415 kilopascals (kPa) are sometimes called low modulus elastomeric sealants. The use of hybrid-functional mercaptopolydiorganosiloxanes alone, blends of pendant- and terminal-functional mercaptopolydiorganosiloxanes, or blends of hybrid- and terminal-functional mercaptopolydiorganosiloxanes can result in a low modulus elastomeric sealant product with excellent unprimed adhesion to a large number of building substrates. To prepare such low modulus elastomeric sealant compositions, it is preferred that the mercaptopolydiorganosiloxanes utilized are those described above wherein $R^1$ and $R^5$ are methyl, n is 3, the average molecular weight of the mercaptopolydiorganosiloxanes utilized is less than 100,000 and the weight percent mercapto groups present in the hybrid-functional mercaptopolydiorganosiloxane or present in the total blend is in the range of 0.1 to 0.45 weight percent. It should be noted that cured elastomers with higher modulus values, especially those formulated with pendant-functional mercaptopolydiorganosiloxanes alone, do not have exceptionally good adhesion to substrates and can require the use of primers in certain applications.

Fillers may be used with the compositions of this invention, but are not required. Extending fillers can preferably be used in amounts of 10 to 200 parts by weight per 100 parts by weight of mercaptoorganosiloxane, especially in the elastomeric sealant formulations. Suitable extending fillers can be titanium dioxide, calcium carbonate, talc, clay, ground or crushed quartz, diatomaceous earth, fibrous filler such as glass or asbestos, and the like. Reinforcing fillers such as fume silica, surface-treated fume silica, carbon black and the like may also be used. As is well-known in the art, reinforcing fillers cannot be used in as large an amount as extending fillers can be used, thus any formulation including such fillers would not contain more than 70 parts by weight of reinforcing filler per 100 parts by weight of the mercaptoorganosiloxanes and preferably, from 5 to 30 parts. Extending fillers can also be included in formulations containing reinforcing fillers in amounts of up to 200 parts by weight per 100 parts by weight of the mercaptoorganosiloxanes less the amount of reinforcing filler present, provided that the capacity of the mercaptopolydiorganosiloxanes to accept such amounts of filler is not exceeded. Other additives such as coloring pigments, fire-retardant compounds and the like are also contemplated as being useful in the present invention. Since the catalytic action of cobaltocene is affected by water, it is preferred that any fillers or additives be substantially free of water to provide maximum shelf life. Routine testing can determine the effect of fillers and additives on shelf life.

Cobaltocenes contemplated as being useful as catalysts in the practice of the present invention are cobaltocene or dicyclopentadienyl cobalt, $(C_5H_5)Co(C_5H_5)$, and substituted cyclopentadienyl derivatives such as $(CH_3C_5H_4)Co(C_5H_5)$ and $(CH_3C_5H_4)Co(C_5H_4CH_3)$. The amount of catalyst necessary is not critical. Any catalytic amount can be employed which will adequately polymerize or cure the compositions in the presence of oxygen to result in a product which is satisfactory for the desired end use. Changing the level of catalyst can alter the rate of polymerization or cure and can alter the properties of the product, especially in the elastomers. We have found that a range of 0.01 to 6 parts by weight of compound per 100 parts by weight of the mercaptoorganosiloxanes present is preferred. The preferred catalyst is cobaltocene. For elastomeric sealant compositions, 0.08 to 0.30 parts by weight of cobaltocene per 100 parts by weight of mercaptoorganosiloxanes present is preferred.

As noted above, cobaltocenes are oxidized by air and can absorb carbon dioxide. Water also appears to reduce the catalytic activity of the compounds somewhat and results in a longer cure time. Thus it is preferable to dissolve the cobaltocenes in a non-polar organic solvent such as toluene. We have utilized an 8 percent by weight solution of cobaltocene in toluene with good results. Cobaltocenes are known in the art and methods for the preparation of the cobaltocenes may be found in the literature such as in Green, Pratt and Wilkinson, "A New Type of Transition Metal-Cyclopentadiene Compound," Journal of the Chemical Society, pp. 3753–3767 (1959) which is hereby incorporated by reference to teach the production of cobaltocenes useful in the present invention.

It is believed that the compositions of the present invention polymerize or cure to form higher molecular weight products by the formation of disulfide (—SS—) bonds upon exposure to oxygen due to the action of the cobaltocene catalyst.

The compositions polymerize or cure rapidly at room temperature and appear to cure from the surface in contact with oxygen inward. Elastomeric sealant compositions have been shown to cure to a 0.3 centimeter thick section in 5 hours and to a 2.5 centimeter thick section in fourteen days. Heating will accelerate the rate of cure in the manner that most chemical reactions are accelerated by a rise in temperature. Compositions containing low amounts of mercapto groups, such as those containing less than 2 weight percent mercapto groups, are essentially free of offensive odor. When compared to moisture-cure sealants which evolve acetic acid during cure, such as those found in U.S. Pat. Nos. 3,035,016 and 3,077,465, the compositions of this invention are non-corrosive to the substrate and evolve practically no volatile by-products of cure. The polymerization reaction only requires the presence of oxygen which is readily available from the atmosphere. In practicing the present invention, a formulator may select polymers and fillers which together with the proper level of catalyst will yield a variety of products such as encapsulating gels, hard resins, coatings and especially useful elastomeric sealants.

The following examples are intended as being merely illustrative and are not to be construed as limiting the scope of the present invention, which is properly defined by the appended claims.

EXAMPLE 1

To demonstrate the utility of the present invention in forming elastomeric sealants, the following composition was prepared. A pedant-functional, mercaptopolydiorganosiloxane which was a trimethylsiloxy-endblocked copolymer of dimethylsiloxane and 3-mercaptopropylmethylsiloxane units was prepared using the following procedure. The following ingredients were added to a 22 liter three-necked flask equipped with a thermometer, stirrer and reflux condenser: 51.5 grams of hexamethyldisiloxane and 256 grams of the 3-mercaptopropylmethyl hydrolyzate of 3-mercaptopropylmethyldimethoxysilane. The contents were heated with stirring and dry nitrogen gas purge to 65° C. At 65° C., two milliliters of trifluoromethanesulfonic acid was added. Then 2 liters (1900 grams) of a cyclic polydimethylsiloxane mixture having an average formula $(Me_2SiO)\sim_4$ was added to the flask over a two-hour period. The cloudy mixture was heated to 80° C., 9.2 milliliters of trifluoromethanesulfonic acid was added, and the mixture was held at that temperature until the mixture became clear (approximately 30 minutes). At that point, 16,793 grams of the above cyclic polydimethylsiloxane mixture was rapidly added to the reaction mixture in the flask over a period of 15 minutes. When the addition was complete, the reaction mixture was allowed to equilibrate by allowing the mixture to stir at 80° C. for an additional 16 hours. Then 1.14 grams of distilled water was added and the mixture was allowed to equilibrate for another 8 hours at 80° C. The reaction mixture was then cooled and 112 grams of sodium bicarbonate was added to neutralize the acid catalyst. The reaction mixture was then diluted with an equal volume of toluene to facilitate filtration and filtered through a charcoal filter. The volatile materials were then distilled from the filtrate by heating at a pressure of approximately 5 millimeters of mercury until the temperature of the material left in the flask reached 155° C. The mercaptopolydiorganosiloxane (hereinafter referred to as polymer A) obtained after removal of the volatile portion had a viscosity of 38.93 Pa·s (Pascal-seconds) at 25° C. and contained 0.41 weight percent mercapto groups. The weight percent of mercapto groups was determined analytically using the iodine titration test outlined in Critchfield, Organic Functional Group Analysis, MacMillan Co., NY, p. 166 (1963). Polymer A had a number average molecular weight of 80,500 as determined by fast gel permeation chromatographic analysis using polydimethylsiloxane reference standards.

A base was prepared by milling 100 parts by weight of the above polymer with 150 parts by weight of a calcium carbonate filler on a three-roll mill. This base was then placed in a SemKit ® tube (commercially available from Semco, Inc., division of Products Research and Chemical Corp., Glendale, CA) which is a cylinder having the appearance of a tube commonly used for caulking compounds which contains a means for stirring the contents and is designed to be placed in a vacuum to remove volatile materials from compositions placed inside the tube. Since the base was milled in the presence of air, the base was de-aired by subjecting it to a vacuum of 30 millimeters of mercury for 30 minutes. A seal was then placed on the back of the tube. Various levels, as defined in Table I, of cobaltocene, $(C_5H_5)Co(C_5H_5)$, catalyst were injected into the sealed SemKit ® tubes as an 8 percent by weight solution in toluene and the stirrer was used to evenly incorporate the catalyst into the base.

Upon exposure to air at room temperature (22° C.), the compositions rapidly formed a surface skin (skin-over time) and became tack-free to touch with a polyethylene sheet in less than an hour. The levels of catalyst and the properties of the composition cured for 7 days at room temperature are tabulated in Table I. The durometer was determined by ASTM-D-2240 with the results reported in Shore A while the tensile strength, elongation and modulus at 100 percent elongation were determined by ASTM-D-412.

TABLE I

| | | Elastomeric Sealant Compositions | | | | | |
|---|---|---|---|---|---|---|---|
| Formulation | Parts[1] of $(C_5H_5)_2Co$ | Skin-Over Time (Minutes) | Tack-Free Time (Minutes) | Durometer (Shore A) | Tensile (kPa) | Elongation (percent) | Modulus @ 100% Elongation (kPa) |
| A | 0.040 (0.10) | 4 | 10 | 33 | 793 | 250 | 724 |
| B | 0.024 (0.06) | 8 | 30 | 30 | 814 | 300 | 724 |
| C | 0.008 (0.02) | ~20 | ~40 | 16 | 745 | 650 | 345 |

[1]Parts of catalyst per 100 parts of base, added as an 8 percent by weight solution in toluene. The figures in parentheses are parts of catalyst added per 100 parts of mercaptopolydiorganosiloxane.

EXAMPLE 2

The use of both pendant- and terminal-functional mercaptopolydiorganosiloxanes to produce a low modulus sealant composition suitable for use as a building sealant was demonstrated. Cured compositions possessed excellent unprimed adhesion to glass, concrete and metals such as aluminum.

A terminal-functional mercaptopolydiorganosiloxane which was a 3-mercaptopropyldimethylsiloxy-endblocked polydimethylsiloxane (hereinafter referred to as Polymer B) was prepared according to the following procedure. The following ingredients were added to a 5 liter, 3-necked flask containing a stirrer, reflux condenser and a nitrogen sparge tube: 2988.9 grams (~3136 ml) of the same type of cyclic polydimethylsiloxane mixture used in Example 1 and 11.06 grams of sym-tetramethyl bis(3-mercaptopropyl)disiloxane. The contents were stirred and purged with dry nitrogen gas while heating to 65° C. At a constant 65° C., 1.77 ml. of trifluoromethanesulfonic acid was added. After 4.6 hours of reaction in the presence of the acid catalyst, 6 microdrops (~0.06 grams) of distilled water was added to the contents. After another 1.9 hours at 65° C., the mixture was neutralized with 17.7 grams of sodium bicarbonate and allowed to stir overnight at room temperature. The mixture was diluted with an equal volume of toluene, pressure filtered and vacuum distilled to remove volatile matter at less than 1 millimeter of mercury pressure to a pot temperature of 150° C. Polymer B contained 0.14 weight percent of mercapto groups, had a viscosity of 41.01 Pa·s at 25° C. and had a number average molecular weight of 49,600.

The pendant-functional mercaptopolydiorganosiloxane used in this example was from a different batch of Polymer A which contained 0.41 weight percent of mercapto groups, had a viscosity of 40.10 Pa·s at 25° C. and had a number average molecular weight of 104,000.

The samples used in this example were prepared according to the procedure outlined in Example 1. A base was prepared using 87 parts of Polymer B, 13 parts of the above pendant-functional mercaptopolydiorganosiloxane and 150 parts of a calcium carbonate filler. The levels of catalyst added to this base are shown in Table II. The catalyzed compositions were then extruded and cured for 7 days at room temperature in the presence of air before determining the physical properties of the cured sealant compositions.

ant-functional mercaptopolydiorganosiloxane (from a different batch with almost identical viscosity and weight percent mercapto groups) and filler was used as in Example 2. Four different levels of catalyst were added to this base and the properties obtained are summarized in Table III.

TABLE III

| | Optimized Catalyst Concentration, Low Modulus Sealant Composition | | | | | | |
|---|---|---|---|---|---|---|---|
| Formulation | Parts[1] of (C$_5$H$_5$)$_2$Co | Skin-Over Time (Minutes) | Tack-Free Time (Minutes) | Durometer (Shore A) | Tensile Strength (kPa) | Elongation (percent) | Modulus @ 100% Elongation (kPa) |
| A | 0.16 | 9 | 14 | 15 | 745 | 1510 | 276 |
| B | 0.12 | 9 | 15 | 15 | 724 | 1560 | 262 |
| C | 0.08 | 12 | 32 | 14 | 676 | 1515 | 262 |
| D | 0.04 | 65 | 2 days | 8 | 379 | 1170 | 138 |

[1]Parts per 100 parts by weight of mercaptopolydiorganosiloxane, added as an 8 percent by weight solution in toluene.

EXAMPLE 4

To demonstrate the formation of a resin by curing compositions of the present invention, 3-mercaptopropylmethyl hydrolyzate of 3-mercaptopropylmethyldimethoxysiloxane was prepared wherein the weight percent of mercapto groups was 24.6 and the viscosity at 25° C. was 0.08 Pa·s. Twenty grams of this hydrolyzate was mixed with 2.5 grams of an 8 percent by weight solution of cobaltocene in toluene and exposed to air at room temperature. After 10 hours exposure to air, a layer which was approximately 0.25 millimeters (mm) thick of highly cross-linked material had formed on the surface. After three days at room temperature, a brittle layer approximately 1.4 mm thick had formed while the viscosity of the unexposed liquid was relatively unchanged. After 6 days, the cured layer was approximately 1.8 mm thick. Heating would be expected to greatly accelerate the cure time. Generally, protective coating films range in thickness from 0.1 to 0.50 mm depending upon the application. Thus, thin layers of this composition could be used to form a resinous coating on a substrate.

EXAMPLE 5

The cure rate of sealants of the present invention was investigated by measuring the thickness of cured sealant compositions as a function of time. Clear, cylindrical glass jars with a volume of approximately 15 milliliters and an outside diameter of 1.9 centimeters were used. A low modulus sealant composition, the same as Formula-

TABLE II

| | Low Modulus Elastomeric Sealant Compositions | | | | | | |
|---|---|---|---|---|---|---|---|
| Formulation | Parts[1] of (C$_5$H$_5$)$_2$Co | Skin-Over Time (Minutes) | Tack-Free Time (Minutes) | Durometer (Shore A) | Tensile Strength (kPa) | Elongation (percent) | Modulus @ 100% Elongation (kPa) |
| A | 0.12 | 6 | 18 | 15 | 621 | 1360 | 241 |
| B | 0.08 | 25 | 55 | 14 | 482 | 1250 | 241 |

[1]Parts of catalyst per 100 parts of mercaptopolydiorganosiloxane, added as an 8 percent by weight solution in toluene.

EXAMPLE 3

Various levels of cobaltocene catalyst were used to discover the optimum level of catalyst necessary for low modulus building sealant compositions of the formulation used in Example 2. A base was prepared using 87 parts by weight of a terminal-functional mercaptopolydimethylsiloxane of the same general structure as polymer B, but from a different batch, which contained 0.1 weight percent mercapto groups and a viscosity of 37.80 Pa·s at 25° C. The same type and amount of pendtion A of Example 3, was extruded into these jars so that the surface was left exposed to air and the thickness of the cured layer could be observed from the side. The compositions were left exposed to air at room temperature (22° C.) and the thickness of the cured compositions at various intervals is summarized below.

| TIME | THICKNESS (Millimeters) |
|---|---|
| 0 | 0 |
| 2 hours | 1.6 |
| 5 hours | 3.2 |
| 20 hours | 6.4 |
| 2 days | 9.5 |
| 5 days | 15.9 |
| 12 days | 23.8 |
| 14 days | 25.4 |
| 20 days | 30.2 |
| 23 days | 33.3 |

The above experiment demonstrates that the composition cures from the surface exposed to air inward.

The above data also demonstrates a significant advantage possessed by these sealants over room temperature vulcanizable (RTV) one-package sealants currently available. Moisture-cured RTV sealants generally take at least one day to cure to a depth of 3.2 to 6.4 mm and may take several weeks to cure to a depth of 12.7 mm. The above data shows that a thickness of 1.6 mm can be attained in 2 hours, a 6.4 mm thickness in 20 hours and 25.4 mm in two weeks. Thus, substantially faster room temperature cure rates can be obtained using compositions of the present invention.

EXAMPLE 6

An investigation of the shelf-life of catalyzed compositions was made. The composition used in the study was the same composition used in Formulation B of Example 3. The composition used was sealed into a number of identical aluminum toothpaste type tubes and samples were stored at room temperature (22° C.) and in an oven at 70° C. A slight amount of catalyst was lost in mixing and adding the samples to the tubes. However, the cured properties were not significantly affected, so the testing was continued. After aging for a period of time, the contents of the sealed tube was extruded at room temperature in the presence of air and both the tack-free time and the skin-over time were recorded. After 7 days at room temperature, the properties of the cured compositions were determined and are summarized in Table IV.

TABLE IV
Shelf-Life Stability Testing

A. Room Temperature Storage (22° C.)

| Storage time | Skin-Over Time (Minutes) | Tack-Free Time (Minutes) | Durometer (Shore A) | Tensile Strength (kPa) | Elongation (percent) | Modulus @ 100% Elongation (kPa) |
|---|---|---|---|---|---|---|
| Initial | 10 | 22 | 15 | 772 | 1310 | 276 |
| 1 day | 12 | 25 | — | — | — | — |
| 3 days | 13 | 30 | 16 | 779 | 1360 | 276 |
| 7 days | 13 | 36 | 15 | 793 | 1270 | 290 |
| 15 days | 12 | 34 | 16 | 689 | 1280 | 276 |
| 22 days | 16 | 48 | 16 | 724 | 1230 | 296 |
| 28 days | 15 | 33 | 16 | 758 | 1275 | 290 |

B. Oven Stability (70° C.)

| Storage Time | Skin-Over Time (Minutes) | Tack-Free Time (Minutes) | Durometer (Shore A) | Tensile Strength (kPa) | Elongation (percent) | Modulus @ 100% Elongation (kPa) |
|---|---|---|---|---|---|---|
| Initial | 10 | 22 | 15 | 772 | 1310 | 276 |
| 2 days | 12 | 36 | — | — | — | — |
| 3 days | 11 | 57 | 15 | 758 | 1280 | 276 |
| 7 days | 14 | 56 | 15 | 793 | 1310 | 276 |
| 15 days | 16 | 76 | 14 | 711 | 1340 | 276 |
| 22 days | 14 | 78 | 13 | 655 | 1230 | 276 |
| 28 days | 19 | 76 | 13 | 642 | 1240 | 269 |
| 37 days | 22 | 80 | — | — | — | — |
| 13 weeks | 18 | 63 | 12 | 621 | 1370 | 207 |

From the above data, it appears that storage affects the tack-free time more than the skin-over time. The other properties change little with time. Based on prior experience, the oven stability data indicates that the compositions should have a shelf life in excess of a year in aluminum tubes.

EXAMPLE 7

A hybrid-functional mercaptopolydiorganosiloxane polymer was prepared by the following procedure. 3.8 grams of sym-tetramethyl bis(3-mercaptopropyl)-disiloxane and 1.35 grams of the 3-mercaptopropylmethyl hydrolyzate of 3-mercaptopropylmethyldimethoxysilane were added to a 2 liter, 3-necked flask equipped with a stirrer, reflux condenser and a thermometer. Then 100 milliliters (~95 grams) of a cyclic polydimethylsiloxane mixture having an average formula $\{(CH_3)_2SiO\} \sim 4$ was added and the cloudy mixture was stirred while heating to 65° C. At 65° C., 0.59 ml (~1 gram) of trifluoromethanesulfonic acid was added and the temperature was raised to 85° C. and held there for 15 minutes. At that point, the mixture became clear. Then, 944 ml (~899 grams) of the above cyclic polydimethylsiloxane mixture was slowly added over a one hour period while the stirring reaction mixture was maintained at 85° C. When the addition was complete, the mixture was allowed to equilibrate by stirring the mixture for an additional 6 hours at 85° C. The reaction mixture was then cooled and 5.9 grams of sodium bicarbonate was added to neutralize the acid catalyst. The reaction mixture was then removed and reduced in viscosity with an equal volume of toluene to facilitate filtration and filtered through a charcoal filter. The volatile materials were distilled from the reaction mixture by heating at a pressure of less than 2 millimeters of mercury and collecting the distillate until the temperature of the distillation pot reached 150° C. The hybrid-functional mercaptopolydiorganosiloxane product obtained had a viscosity of 38.4 Pa·s at 25° C., contained 0.13 weight percent mercapto groups and was a 3-mercaptopropyldimethylsiloxy-endblocked copolymer of dimethylsiloxane and 3-mercaptopropylmethylsiloxane units. The number average molecular weight of the product determined by fast gel permeation chromatographic analysis using polydimethylsiloxane reference standards was 65,600.

A low modulus sealant composition was then prepared using the SemKit® procedure outlined in Example 1. The formulation consisted of the following: 100 parts by weight of the hybrid-functional polymer prepared above; 150 parts of a calcium carbonate filler; and 2 parts of an 8 percent by weight solution of cobaltocene in toluene. When a sample of this composition was extruded in the presence of air at room temperature (22° C.), a skin-over time of 5 minutes and a tack-free time of 11 minutes was observed. After seven days exposure to air at room temperature, the cured composition exhibited the following physical properties: durometer (Shore A)-18; tensile strength-827 kPa; elongation at break-1280 percent; and modulus at 100 percent elongation-345 kPa. Samples tested for adhesion exhibited good unprimed adhesion to substrates such as cold-rolled steel.

That which is claimed is:

1. A composition, stable in the absence of oxygen, which comprises a product obtained by mixing the following substantially in the absence of oxygen
   (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

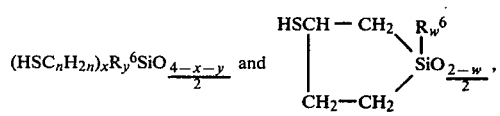

$(HSC_nH_{2n})_xR_y^6SiO_{\frac{4-x-y}{2}}$ and $\begin{array}{c} HSCH-CH_2 \\ | \\ CH_2-CH_2 \end{array} \begin{array}{c} R_w^6 \\ | \\ / \end{array} SiO_{\frac{2-w}{2}}$, any other siloxane units present having the average unit formula

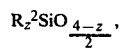

$R_z^2SiO_{\frac{4-z}{2}}$, wherein
   each $R^2$ is a hydroxyl radical or an organic radical selected from the group consisting of $R^6$ and 3,3,3-trifluoropropyl radicals,
   each $R^6$ is $R^5$ or $OR^1$,
   each $R^5$ is an alkyl radical of 1 to 4 inclusive carbon atoms or phenyl radical,
   each $R^1$ is an alkyl radical of 1 to 4 inclusive carbon atoms,
   n has a value of from 2 to 4 inclusive,
   w has a value of from 0 to 1 inclusive,
   x has a value of from 1 to 2 inclusive,
   y has a value of from 0 to 2 inclusive,
   z has a value of from 0 to 3 inclusive and the sum of x+y has a value of from 1 to 3 inclusive, and the ratio of total $R^5$, $HSC_nH_{2n}$—,

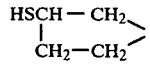

and 3,3,3-trifluoropropyl radicals to silicon atoms in the mercapto-functional organosiloxane is in the range of 0.98/1 to 3.00/1;
   (B) 0-200 parts by weight of at least one filler; and
   (C) a catalytic amount of a cobaltocene of a formula $(R^3C_5H_4)Co(C_5H_4R^4)$ wherein each $R^3$ and $R^4$ is a hydrogen atom or methyl.

2. The composition according to claim 1 wherein the catalytic amount of (C) is in a range of 0.01 to 6 parts by weight per 100 parts by weight of the mercapto-functional organosiloxane and the cobaltocene is $(C_5H_5)_2Co$.

3. The composition as claimed in claim 2 wherein the mercapto-functional organosiloxane is at least one pendant-functional mercaptopolydiorganosiloxane containing $R_3^5SiO_{0.5}$ endblocking siloxane units and mercapto-functional siloxane units selected from the group consisting of $(HSC_nH_{2n})R^5SiO$ and

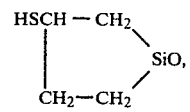

any remaining siloxane units being $R_2^5SiO$, wherein the average number of mercapto-functional siloxane units per molecule is greater than 2 and the number average molecular weight of the pendant-functional mercaptopolydiorganosiloxane is less than 400,000.

4. The composition as claimed in claim 3 wherein $R^5$ is methyl, n is 3 and the pendant-functional mercaptopolydiorganosiloxane has a number average molecular weight of less than 100,000 and contains a sufficient number of mercapto-functional siloxane units to result in a weight percentage of mercapto groups in the range of 0.1 to 2.5 percent based upon the total weight of pendant-functional mercaptopolydiorganosiloxane.

5. The composition as claimed in claim 2 wherein the mercapto-functional organosiloxane is at least one hybrid-functional mercaptopolydiorganosiloxane containing two mercapto-functional siloxane units selected from the group consisting of $(HSC_nH_{2n})R_2^5SiO_{0.5}$, $(HSC_nH_{2n})(R^1O)_2SiO_{0.5}$,

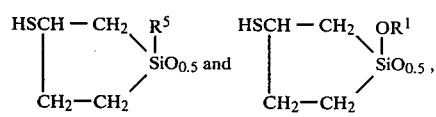

and at least one mercapto-functional siloxane unit selected from the group consisting of $(HSC_nH_{2n})R^5SiO$ and

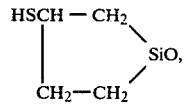

any remaining units being $R_2^5SiO$, wherein the number average molecular weight of the hybrid-functional mercaptopolydiorganosiloxane is less than 400,000.

6. The composition as claimed in claim 2 wherein the mercapto-functional organosiloxane is at least one hybrid-functional mercaptopolydiorganosiloxane containing two mercapto-functional siloxane units selected from the group consisting of $(HSCH_2CH_2CH_2)(CH_3)_2SiO_{0.5}$ and

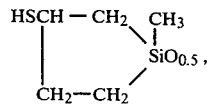

and at least one mercapto-functional siloxane unit selected from the group consisting of $(HSCH_2CH_2CH_2)(CH_3)SiO$ and

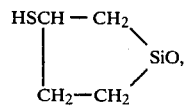

any remaining units being $(CH_3)_2SiO$, wherein the hybrid-functional mercaptopolydiorganosiloxane has a number average molecular weight of less than 100,000 and contains a sufficient number of mercapto-functional siloxane units to result in a weight percentage of mercapto groups in the range of 0.1 to 3 percent based on the total weight of hybrid-functional mercaptopolydiorganosiloxane.

7. The composition as claimed in claim 3 having admixed therewith at least one terminal-functional mercaptopolydiorganosiloxane containing mercapto-functional siloxane units selected from the group consisting of $(HSC_nH_{2n})R_2{}^5SiO_{0.5}$, $(HSC_nH_{2n})(R^1O)_2SiO_{0.5}$,

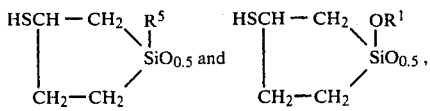

any remaining siloxane units being $R_2{}^5SiO$, wherein the number average molecular weight of the terminal-functional mercaptopolydioganosiloxane is less than 400,000.

8. The composition as claimed in claim 4 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

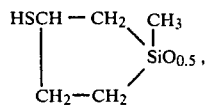

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.5 percent based on the total weight of terminal-functional mercaptopolydiorganosiloxane and the total weight percent of mercapto groups in the admixed mercaptopolydiorganosiloxanes is in the range of 0.1 to less than 2.5 percent of the total weight of the admixed mercaptopolydiorganosiloxanes.

9. The composition as claimed in claim 5 having admixed therewith at least one terminal-functional mercaptopolydiorganosiloxane containing mercapto-functional siloxane units selected from the group consisting of $(HSC_nH_{2n})R_2{}^5SiO_{0.5}$, $(HSC_nH_{2n})(R^1O)_2SiO_{0.5}$,

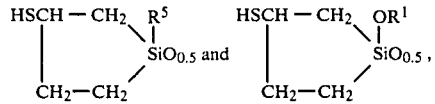

any remaining siloxane units being $R_2{}^5SiO$, wherein the number average molecular weight of the terminal-functional mercaptopolydiorganosiloxane is less than 400,000.

10. The composition as claimed in claim 6 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

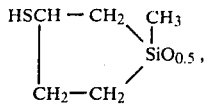

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.5 percent based on the total weight of terminal-functional mercaptopolydiorganosiloxane and the total weight percent of mercapto groups in the admixed mercaptopolydiorganosiloxanes is in the range of 0.1 to less than 3.0 percent of the total weight of the admixed mercaptopolydiorganosiloxanes.

11. A composition which comprises a product formed upon exposure of the composition of claim 2 to oxygen.

12. A cured composition which comprises an elastomer formed upon exposure of the composition of claim 4 to oxygen.

13. A cured composition which comprises an elastomer formed upon exposure of the composition of claim 6 to oxygen.

14. A cured composition which comprises an elastomer formed upon exposure of the composition of claim 8 to oxygen.

15. A cured composition which comprises an elastomer formed upon exposure of the composition of claim 10 to oxygen.

16. A method of forming a higher molecular weight product which comprises the steps of
(I) mixing
(a) 100 parts by weight of at least one mercapto-functional organosiloxane, said mercapto-functional organosiloxane having an average of at least two siloxane units per molecule selected from the group consisting of mercapto-functional siloxane units of the average unit formula

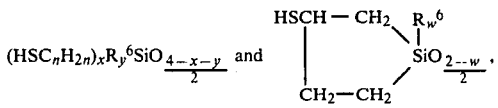

any other siloxane units present having the average unit formula

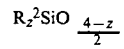

wherein
each $R^2$ is a hydroxyl radical or an organic radical selected from the group consisting of $R^6$ and 3,3,3-trifluoropropyl radicals,
each $R^6$ is $R^5$ or $OR^1$,
each $R^5$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive, y has a value of from 0 to 2 inclusive, z has a value of from 0 to 3 inclusive and the sum of x+y has a value of from 1 to 3 inclusive, and the ratio of total $R'5$, $HSC_nH_{2n}$-,

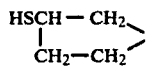

and 3,3,3-trifluoropropyl radicals to silicon atoms in the mercapto-functional organosiloxane is in the range of 0.98/1 to 3.00/1; and (b) a catalytic amount of a cobaltocene of a formula $(R^3C_5H_4)Co(C_5H_4R^4)$ wherein each $R^3$ and $R^4$ is a hydrogen atom or methyl, to form a mixture, and (II) exposing said mixture to oxygen.

17. The method as claimed in claim 16 wherein the amount of the cobaltocene product is in a range of 0.01 to 6 parts by weight per 100 parts by weight of (I)(a) and the cobaltocene is $(C_5H_5)_2Co$.

18. The method as claimed in claim 16 wherein the mixture of (I) additionally contains up to 200 parts by weight of at least one filler per 100 parts by weight of (I)(a).

19. A composition which comprises the higher molecular weight product obtained in accordance with the method of claim 16.

20. A composition which comprises the higher molecular weight product obtained in accordance with the method of claim 17.

21. A composition which comprises the higher molecular weight product obtained in accordance with the method of claim 18.

22. The composition as claimed in claim 1 which contains at least one filler.

23. The composition as claimed in claim 2 which contains at least one filler.

24. The composition as claimed in claim 11 which contains at least one filler.

* * * * *

UNITED STATES PATENT AND TRADEMARK OFFICE
CERTIFICATE OF CORRECTION

PATENT NO. : 4,239,674

DATED : December 16, 1980

INVENTOR(S) : GARY R. HOMAN et al.

It is certified that error appears in the above-identified patent and that said Letters Patent are hereby corrected as shown below:

Column 3, line 13, "The" should read --This--.

Column 21, line 4, "R'5," should read --$R^5$,--.

Signed and Sealed this

Fifth Day of May 1981

[SEAL]

Attest:

RENE D. TEGTMEYER

Attesting Officer     Acting Commissioner of Patents and Trademarks